United States Patent [19]

Spevack

[11] 4,192,847
[45] * Mar. 11, 1980

[54] THERMAL CONTROL IN DUAL TEMPERATURE SYSTEMS

[75] Inventor: Jerome S. Spevack, New Rochelle, N.Y.

[73] Assignee: Deuterium Corporation, New Rochelle, N.Y.

[*] Notice: The portion of the term of this patent subsequent to Mar. 18, 1992, has been disclaimed.

[21] Appl. No.: 676,217

[22] Filed: Apr. 12, 1976

Related U.S. Application Data

[60] Continuation of Ser. No. 201,238, Nov. 22, 1971, abandoned, which is a division of Ser. No. 587,365, Sep. 26, 1966, which is a continuation of Ser. No. 822,973, Jun. 25, 1959, abandoned, which is a division of Ser. No. 188,925, Sep. 29, 1950, Pat. No. 2,895,803.

[51] Int. Cl.² ............... B01D 11/04; C01B 5/02; B01D 19/00; C01B 4/00
[52] U.S. Cl. ............................. 422/198; 423/580; 203/49
[58] Field of Search .............. 203/49; 23/270.5 W, 23/260, 263, 284; 423/579, 580 H; 422/198

[56] References Cited

U.S. PATENT DOCUMENTS

| 2,640,018 | 5/1953 | Heath | 203/49 |
|---|---|---|---|
| 2,741,543 | 4/1956 | Verey | 423/580 H |
| 2,895,803 | 7/1959 | Spevack | 23/270.5 W |
| 2,902,414 | 9/1959 | Schmerzler | 203/49 |
| 2,952,525 | 9/1960 | Harteck | 23/270.5 W |
| 3,028,222 | 4/1962 | Eriksson | 23/270.5 W |
| 3,142,540 | 7/1964 | Spevack | 23/270.5 W |
| 3,336,113 | 8/1967 | Denton | 423/580 H |
| 3,431,080 | 3/1969 | Rostaing | 23/270.5 W |
| 3,871,833 | 3/1975 | Spevack | 423/580 H |
| 3,907,508 | 9/1975 | Spevack | 23/270.5 W |

FOREIGN PATENT DOCUMENTS 574293  4/1959  Canada .................. 423/580 H

Primary Examiner—Stephen J. Emery
Attorney, Agent, or Firm—Hall & Houghton

[57] ABSTRACT

Apparatus for thermal control in dual temperature systems in which both liquid and gas are present together at different temperatures in different locations in the system. Hot humidified gases rather than being cooled with water are circulated in a cyclic treatment reclaiming their heat which is then used for heating and humidification of gases entering a hot tower.

14 Claims, 7 Drawing Figures

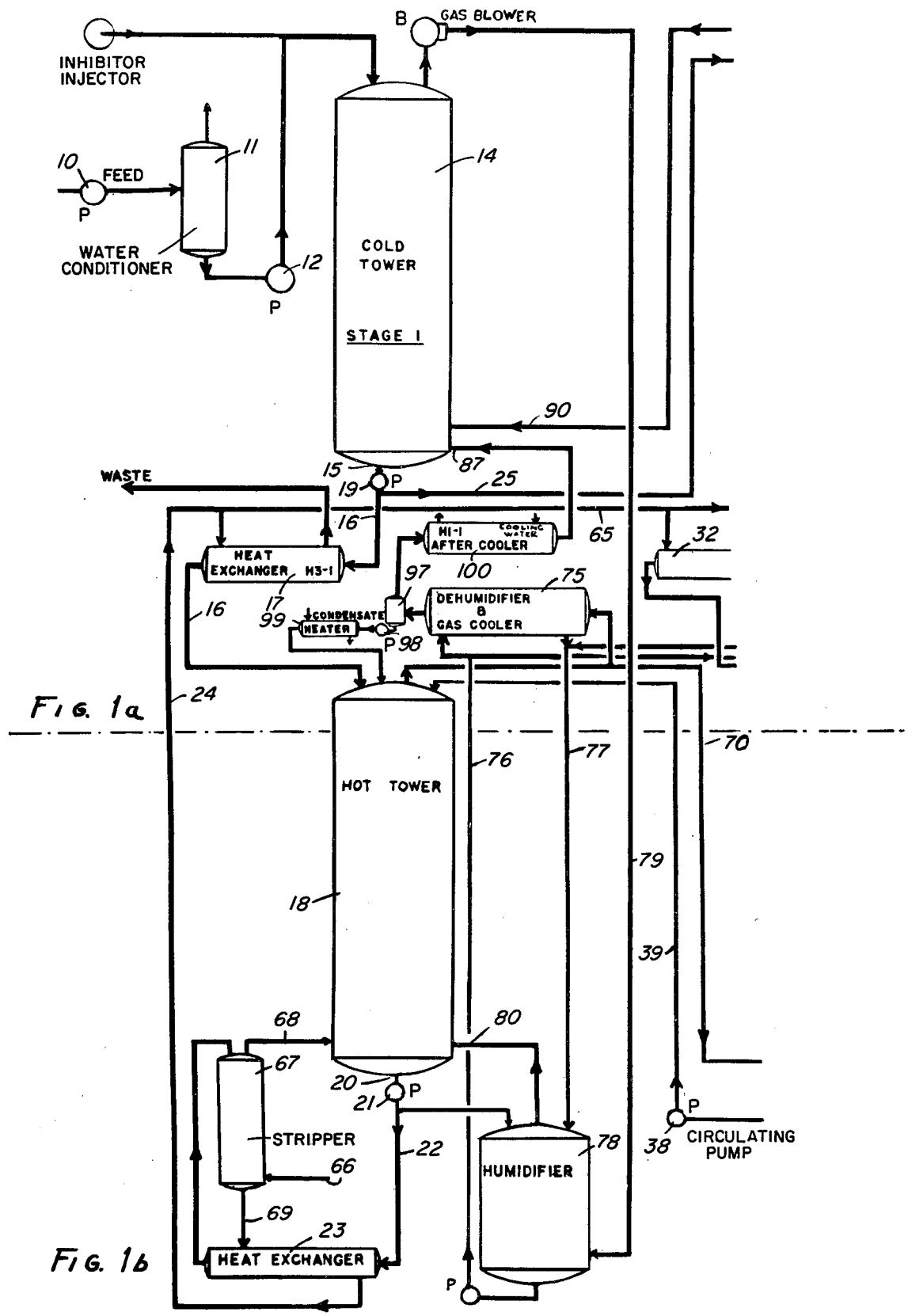

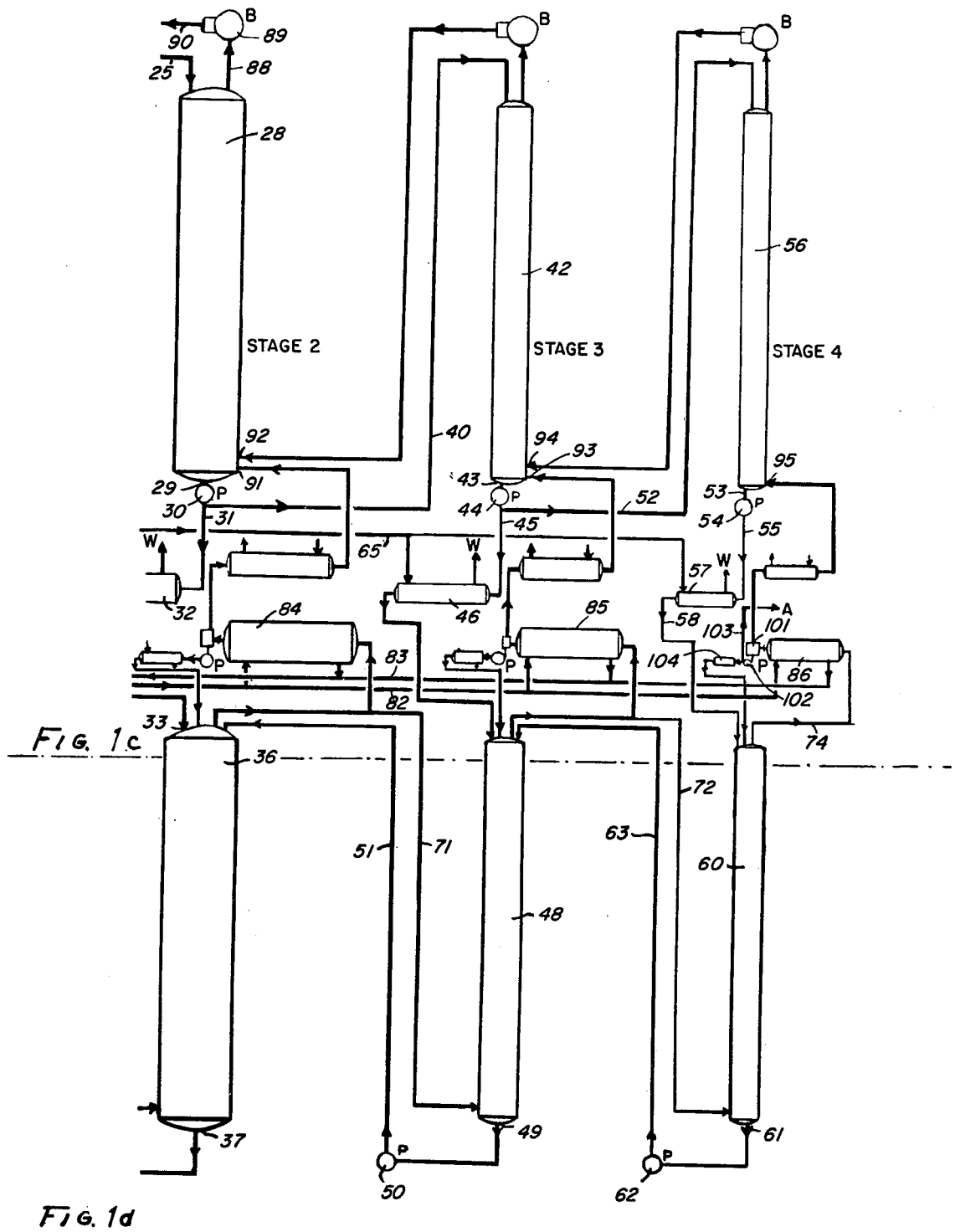

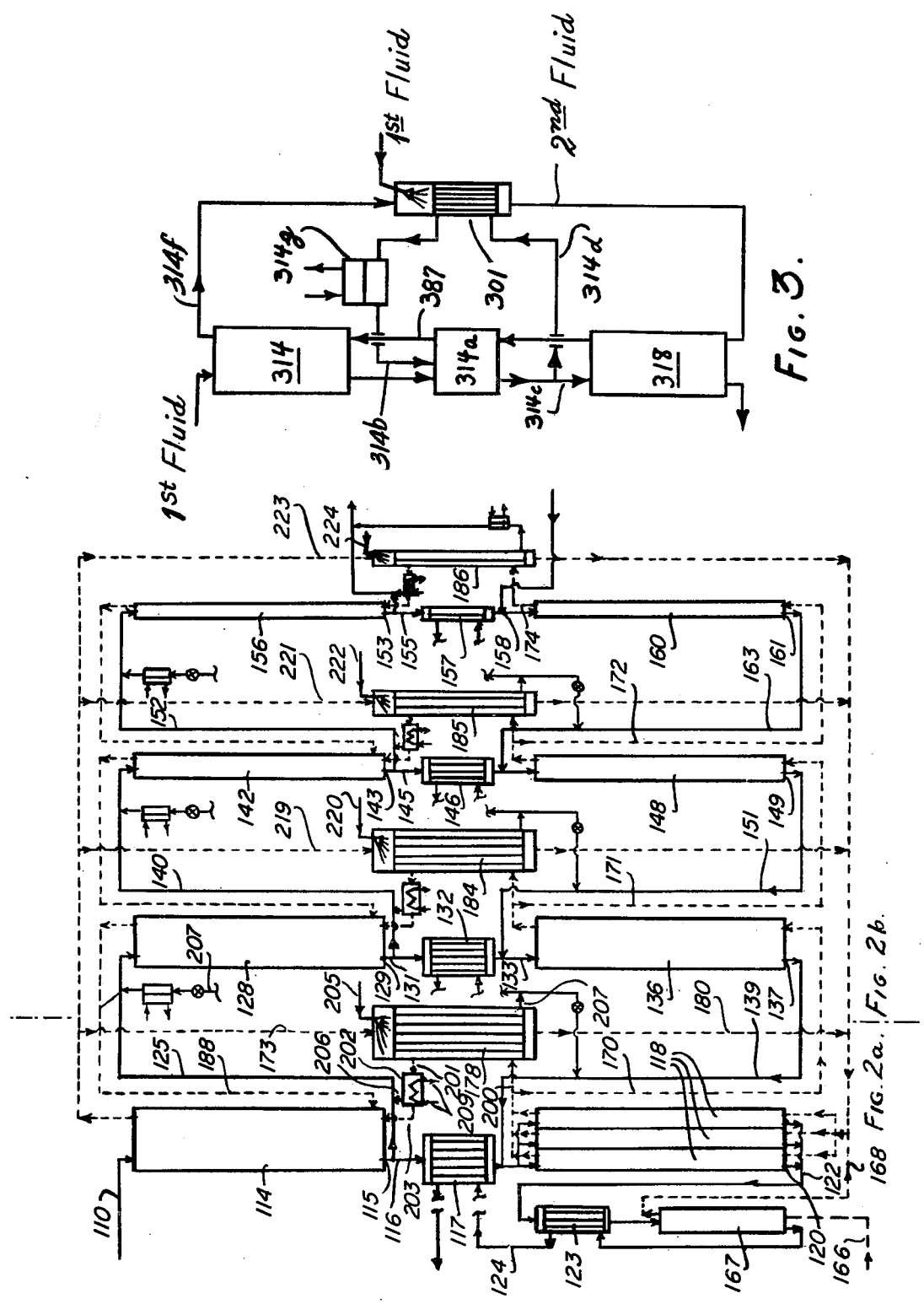

THERMAL CONTROL IN DUAL TEMPERATURE SYSTEMS

CROSS REFERENCE TO RELATED APPLICATIONS

This is a continuation of application Ser. No. 201,238 filed Nov. 22, 1971 (now abandoned), which was a division of application Ser. No. 587,365 filed Sept. 26, 1966 as a continuation of application Ser. No. 822,973 filed June 25, 1959, which was a division of original application Ser. No. 188,925 filed Sept. 29, 1950 (now U.S. Pat. No. 2,895,803 issued July 21, 1959). Another division of said application Ser. No. 587,365 was filed Apr. 30, 1970 as application Ser. No. 43,626 (now abandoned), which was continued in application Ser. No. 330,327 filed Feb. 7, 1973 (now U.S. Pat. No. 3,871,833 issued Mar. 18, 1975), and said application Ser. No. 587,365 was also continued in application Ser. No. 214,494 filed Dec. 30, 1971 (now U.S. Pat. No. 3,940,473 issued Feb. 24, 1976).

The described invention which is claimed herein relates to improvements in methods and apparatus for the control of temperature, saturation and solubility in systems in which both liquid and gas are present together, at different temperatures in different locations in the system. In such systems, for instance, as disclosed in U.S. Pat. No. 2,787,526, issued Apr. 2, 1957, a single stage system or each stage of a cascade employs a cold tower and a hot tower and the progress of the exchange reactions through the system has required alternate and repeated cooling and heating of the substances involved in a very costly manner. These temperature reversals taken with the humidity and solubility variations of the essentially saturated liquid and gas phases which contact each other at such cold and hot temperatures, and loss of costly materials with the waste, have constituted the outstanding factors in the operating costs and have been determinative of the practicability of the system.

An object of this invention is to provide improved systems for reducing such cost factors in a manner economizing on the energy to the supplied and greatly reducing the cost of operation while at the same time maintaining the rate and quality of output.

Further objects of the invention will appear from the following specification taken in connection with the accompanying drawings in which:

FIGS. 1a, 1b, 1c, and 1d show connected parts of a flow diagram illustrating preferred embodiments of the present invention associated in a cascade embodiment of a system of the class described;

FIGS. 2a and 2b show a similar flow sheet illustrating a modified form of temperature and humidity adjusting systems of this invention;

FIG. 3 shows a similar flow sheet of a further modification of the temperature and humidity adjusting system.

The features of the present invention are typically illustrated in connection with the concentration of deuterium by countercurrent reactions at contrasting high and low temperatures. Where the reactants for this purpose are hydrogen sulfide gas ($H_2S$) and liquid water ($H_2O$), the reactions are ionic as explained in my aforesaid parent application and equilibrium conditions favor concentration of the deuterium in the water phase with a greater concentration effect occurring at the lower temperature. Proper operation of the process gives rise to a concentration gradient in the towers and causes an accumulation of deuterium as heavy water at the bottom of the cold tower. In the systems shown, hydrogen sulfide gas is continuously recycled from the top of the cold tower to the bottom of the hot tower, always flowing countercurrent to the water.

The supply of liquid, e.g. water, (FIG. 1a) enters at 10 and passes through water conditioner 11 and pump 12 to the top of the cold tower 14 of the first stage. As hereinafter explained, there is a countercurrent of gas ($H_2S$) passing upward in this tower 14, the temperature of this cold exchange reactor being maintained at about 20° C., for instance, for a pressure of 5 atmospheres.

The cold liquid discharged at 15 at the bottom of the tower by pump 19 is divided, one portion going by conduit 16 through heat exchanger 17 to be heated thereby and passed on to the top of the hot tower 18 of this first stage. Here again there is a countercurrent of gas for the hot (80° C.) exchange reaction and the hot liquid discharged at 20 at the bottom of the tower is passed by pump 21 and conduit 22 through the fluid heating side of heat exchanger 23 and stripper 67 removing dissolved gas ($H_2S$) from the liquor and raising the temperature of the liquor hich then passes through the fluid cooling side of heat exchanger 23 and conduit 24 to heat exchanger 17 where it serves to raise the temperature of the first stage liquid passing from the cold to the hot tower. The discharge of this circulation of heating liquid from exchanger 17 passes to waste.

The other portion of the cold liquid discharged from the cold tower at 15 passes by conduit 25 to subsequent operations, from which hot liquid may be received through pipe 39 to the top of the hot tower 18. Thus in the form shown in FIGS. 1a–1d the liquid from conduit 25 passes to the top of the cold tower 28 of the second stage for the cold (20° C.) reaction with the upward sweeping countercurrent of gas and the cold liquid discharged at 29 passes through pump 30 and in part through pipe 31 and heat exchanger 32 raising the temperature of the liquid for entry at 33 into the hot tower 36 where it meets the countercurrent of gas, this hot reaction being at about 80° C. and discharging the hot liquid at 37 to pump 38 passing the liquid through pipe 39 to the top of the hot tower 18. The remainder of the cold discharge from tower 28 passes by piping 40 to the top of the cold tower 42 of the third stage where it is reacted by the countercurrent gas and discharged at 43 to be passed by pump 44 and by piping 45 to heat exchanger 46 raising its temperature for discharge through piping 42 to the top of the hot (80° C.) tower 48 and is subjected to reaction with the countercurrent gas and discharge at 49 through pump 50 passing the hot liquid through piping 51 to the top of the next preceding hot tower 36. The other part of the cold discharge from tower 42 passes by pipe 52 to the top of the fourth stage cold tower 56 at 20° C. where it reacts with the countercurrent gas and is discharged at 53 through pump 54 and piping 55 to heat exchanger 57 and piping 58 to the hot tower 60. The discharge of hot liquid from this tower at 61 is passed by pump 62 and piping 63 to the top of the hot tower 48 of the preceding stage, completing the circuit of the liquid within the system unless additional stages are found advantageous.

No temperature treatment is required for the liquid flows to the cold towers assuming an initial supply at the right temperature. The liquids supplied to the hot towers are raised in temperature by the heated waste discharge. In the form shown this waste discharge flows from the primary hot tower 18, and waste pipe 24 is connected to feed pipe 65 leading to the heat exchangers 32, 46 and 57 of the second, third and fourth stages respectively. The temperature regulation of the liquid is thus provided from sources within the system and additional steam is only drawn upon in connection with the final stripping of the discharge liquor at 67 and return of the separated gas to the hot tower 18.

This stripping is another feature of the improved process whereby dissolved gas ($H_2S$) is removed from the waste liquor. This is accomplished in a simple but effective way at essentially no extra energy expense. The amount of steam that is still required to make up for process inefficiencies and to complete the gas heating and humidification as hereinafter explained, is put to an additional use before it enters the hot tower 18. This steam entering at 66 is passed countercurrent to the processed waste liquor in the contact stripping tower 67. In this manner the dissolved hydrogen sulphide is removed from the waste liquor and swept back through outlet pipe 68 to the hot tower 18 together with the steam. Stripping efficiency which leaves less than one part per million residue may be attained. The hot liquid discharge at 69 from stripper 67 is circulated in heat exchanger 23 to increase the temperature of the waste liquor supply prior to its employment for heating fluid flowing from a cold tower to a hot tower. In the form shown the augmented temperature waste liquid from 23 is applied to heat a plurality of liquid streams flowing from cold towers to hot towers, by delivering it to the subsequent heaters 17, 32, 46 and 57 for the liquid entering the hot towers, the liquor being raised, for instance, from 80° C. in conduit 22 to 85° C. in conduit 24.

In other words, this arrangement embodies apparatus for thermal processing of carried and carrier fluid materials capable of existing in liquid and gaseous phases, e.g., water and $H_2S$, which apparatus, as shown for example in FIGS. 1a–1b, includes a series connection comprising an initial heating means (fluid heating side of heat exchanger 23) for initially heating a flow of carrier fluid (liquid water) essentially saturated with a content of carried fluid ($H_2S$ in solution); a second means 66–67 for the further heating of said flow from 22, 23 and the separation of carried fluid therefrom via 68 subsequent to the initial heating thereof; and a flow producing means, shown as a pump 21, connected in said series connection for delivering through said initial heating means and to said second means 66–67 said flow of carrier fluid. Still referring to FIGS. 1a–1b, the apparatus shown further comprises, in combination with the foregoing, a means (fluid cooling side of heat exchanger 23) connected in said series connection for cooling the further heated flow of carrier fluid passing from 67 via 69 through 23 to 24 and transferring heat from said cooling to the flow of fluid from 22 to 67 in the fluid heating side of heat exchanger 23 while maintaining said flows out of contact with each other. In the illustrated apparatus, the means 66–67 for further heating of said flow from 22, 23 comprises delivery means 66 connected to deliver into direct contact with said flow in 67 a quantity of one of said fluids (water in the form of steam) heated to a higher temperature than that of the initially heated flow in the conduit from 23 to 67. In the form shown the initial heating means (fluid heating side of heat exchanger 23) comprises liquid inlet means from 22 for delivering thereto liquid comprising carried fluid ($H_2S$ in solution) and for vaporizing carried fluid ($H_2S$) therefrom by a part of the heat transferred thereto from the fluid cooling side of heat exchanger 23.

Thus by the disclosed arrangement the flow in the initial heating means (fluid heating side of heat exchanger 23) is enabled to recover from the flow in the cooling means (the fluid cooling side of 23) all of the heat required for both heating said flow in said initial means and for adjusting the content of carried fluid ($H_2S$) contained in the carrier fluid (liquid water) and thus reduces the amount of further heating in 67 which would otherwise be required.

The conditioning of the countercurrent gas (for instance $H_2S$) is attained with utmost economy. The gas supplied in the cold tower 14, and in the cascade form shown to the cold towers 28, 42 and 56, is efficiently cooled and dehumidified and the gas supply to the hot tower 18 is heated and humidified with interchange of energy between these operations. In the multi-stage form shown, the hot towers of the remaining stages receive their supplies from the hot towers of the previous stages, so that all treatment of the gas supplies to the second, third and fourth stage hot towers is dispensed with. This novel multi-stage arrangement, which is claimed in my copending applications, results in a type of cascade system which integrates the plant so that each stage is not an independent unit but is a working part of the overall system. The hot humidified gases required at the bottom of the second stage hot tower 36 are obtained through piping 70 from the hot gases leaving the hot tower 18 of the first stage, and all of the hot liquor from the hot tower 36 of the second stage returns by piping 39 to the hot tower 18 of the first stage. Similarly hot tower 48 receives its gas supply from preceding hot tower 36 by piping 71 and returns to tower 36 its hot liquor discharge by piping 51, while hot tower 60 receives its hot gas through pipe 72 from the preceding hot tower 48 and returns to tower 48 its hot liquid discharge through pipe 63. In said multi-stage arrangement, the final discharge of hot gases from fourth stage hot tower 60 passes out through piping 74 to subsequent conditioning treatment and is then used to supply the countercurrent gas to cold tower 56 of the fourth stage.

An important aspect of the present system is the recovery and use of the low level energy which is available in the cooling and dehumidification of hot humidified gases. Instead of cooling these hot gases with cooling water and wasting the heated water, by the present invention the latter is circulated in a cyclic treatment reclaiming the heat and using it for heating and humidification of gases entering a hot tower.

In the system shown the hot gases from the tower 18 must be cooled and dehumidified before they can be used in the cold tower 14, and in the multi-stage arrangement shown the same problem is presented at each following stage. In accordance with this invention, a supply of these hot gases from tower 18 on their way to the cold tower 14 is passed through the dehumidifier and gas cooler 75 which is cooled by water supplied by pipe 76. This water raised in temperature is fed by pipe 77 to the top of a special humidifier tower 78 and through this tower 78 the cold gases brought by pipe 79 from cold tower 14 are passed in direct contact countercurrent to the hot water. By this efficient direct contact method the cold gases are simultaneously heated and humidified while the circulating liquor is cooled. The hot humidified gases are passed by pipe 80 into the hot tower 18. The cooled liquor is recirculated to the dehumidifier and cooler 75 to pick up another charge of energy for delivery to the humidifier 78. Thus, the recirculated liquid circulates in a closed cycle 75, 77, 78, 76. In the system shown, in which the recirculated liquid comprises water, a small amount of make-up water is continuously added to this liquor cycle in order to replace that portion which is consumed in humidification of the gas stream. This may conveniently be drawn from the discharge pipe 22 from hot tower 18 or from the feed, etc.

A further advantage of the embodiment shown in FIGS. 1a–1d is that all of the energy from the dehumidifiers of all of the stages is available for humidification and gas heating in the humidifier 78 of the first stage. These stages, two, three and four, receive their hot gases direct from the preceding stage in each case and so humidifiers for these stages are dispensed with. In each of these stages the corresponding dehumidifier and cooler 84, 85, 86 intervening in the gas passage between the hot tower and the cold tower is cooled by circulation from pipe 82, drawing its supply from pipe 76, and pipe 83 returning the discharges to pipe 77 so that these dehumidifiers 84, 85, 86 of these subsequent stages are in circuit with the cyclic circulation through humidifier 78 and supply energy thereto.

In the cascade system shown, the cooled gases from hot tower 18 pass into the bottom of cold tower 14 at 87 and are joined there by the cold gases brought from the cold tower 28 by pipe 88, gas pump 89 and pipe 90. Similarly the cold tower 28 is supplied at 91 with cooled gases from hot tower 36 and at 92 with cold gases from tower 42, while tower 42 receives cooled gases at 93 from hot tower 48 and at 94 is supplied with cold gases from cold tower 56, which latter tower receives its supply of gases at 95 solely from hot tower 60.

In addition to the dehumidifying and cooling of the hot gases at 75, 84, 85, 86, they may be subjected to a separating action as in separator 97 of stage one receiving the discharge from cooler 75 and separating out the liquid. In the system shown, the separated liquid from 97 is passed by pump 98 to heater 99 and delivered into the top of the hot tower 18. The energy for heater 99 is supplied from an outside source. The gas discharge from separator 97 is further cooled in aftercooler 100 supplied with cooling circulation from any suitable source and the condensate from this aftercooler is carried into tower 14 with the gas stream. Similar condensers and coolers may be provided at the subsequent stages as shown.

In other words, this arrangement also embodies apparatus for thermal processing of carried and carrier fluid materials capable of existing in liquid and gaseous phases, e.g. water and $H_2S$. As shown, for example, in FIGS. 1a–1b the disclosed apparatus may be described as comprising, in series connection, a first means 78 for heating a flow of carrier gas ($H_2S$) and vaporizing thereinto a liquid (water) to form carried vapor therein, said first means 78 comprising an inlet from 79 thereto and an outlet to 80 therefrom for said flow and liquid inlet means connected from conduit 22 to 78. This arrangement also comprises second means 18, 68, for treating the so heated gas flow from 78 via 80 and further heating the same and adding further vapor of said liquid thereto at the bottom of 18 to be carried thereby, the heat and vapor supplied via 68. This second means 18, 68 has a gas inlet end at the bottom part of 18 with a gas inlet thereto connected by conduit 80 to the gas outlet from said first means 78 to receive said flow therefrom, and has a gas outlet end at the top part of 18 with a gas outlet leading to 75, etc. therefrom. The apparatus further includes a third means (the fluid cooling side of heat exchanger 75) for cooling the so further heated gas flow from 18 and condensing carried vapor of such liquid therefrom. This third means has an inlet thereto connected to the conduit leading from the gas outlet from said second means at the top of 18 for receiving said flow therefrom, and has gas and liquid outlet means via 97 for discharging flows of the cooled gas to 100 and of liquid condensate via 98 therefrom. The system also includes a fourth means shown as conduit 79 connected to the gas inlet to said first means 78 for delivering to said first means said flow of carrier gas, and a fifth means (97, 100, 87, 14 and gas blower B) connected to the gas outlet to 97 of said third means (cooling side of 75) for delivering from said first means said flow of carrier gas. In addition a sixth means 98 is connected via 97 to the liquid outlet means of said third means (cooling side of 85) for delivering thereto via 99, separate from said gas flow to 100, liquid condensed in said third means.

Still referring to FIGS. 1a–1b, the system comprises a seventh means shown as the conduit from 22 to 78 connected to the liquid inlet means of said first means 78, for delivering into direct contact with the flow of gas therein liquid to be vaporized therein, and said first means 78 and said third means (cooling side of 75) have heat transfer means, shown as the fluid heating side of 75, 76 and 77, interconnecting the same for extracting heat from said further heated flow in the third means (cooling side of 75) to effect the said cooling of the gas and condensing of carried vapor therefrom, and for transferring the so extracted heat to said gas flow in the first means 78 to effect the aforesaid gas heating and vaporizing thereinto of liquid to form carried vapor therein. The said heat transfer means, shown as a liquid circulation 76 through the fluid heating side of 75 and through 77 to 78, comprises in the combination an indirect contact heat exchanger 75 for maintaining the gas and condensate in said third means (cooling side of 75) out of contact with the gas and liquid in said first means 78.

Thus by the disclosed arrangement the flow in the first means 78 is enabled to recover from the flow in said third means (the fluid cooling side of 75) all of the heat required for both heating said flow in said first means 78 and for adjusting the content of carried material (water in vapor phase) contained in the carrier material ($H_2S$ gas); and this correspondingly reduces the amount of further heating in 18 which would otherwise be required.

In the final stage of the cascade system of FIGS. 1a–1d the separator 101 separates out the liquid content of the gases from condenser 86 and pump 102 delivers the condensate to discharge pipe 103 and heater 104 from which the liquid raised in temperature is returned to the hot tower 60.

In this form the gas is an exchange medium and is recycled without being consumed. Make-up gas in small amounts may be supplied preferably at the entrance to the cold tower of the first stage.

The diagrammatic showing and descriptions herein are merely illustrative and descriptive of the invention, and changes in number of stages, temperature of operation, pressure of operation, the kinds of substances used, and other details may be resorted to within the principle of the invention.

The modified cascade system to which the invention is applied in FIGS. 2a and 2b is shown with four stages the first of which has the hot reaction divided between three parallel hot towers 118. In general the handling of the flows and the connections of the reactors and stages are similar and the parts in FIGS. 2a and 2b are in most instances numbered one hundred above the numbers applied to the corresponding parts in FIGS. 1a to 1d. For simplicity the pumps have been omitted from FIGS. 2a and 2b and the liquid stream is in full lines and the gas stream in broken lines. The heat recovery arrangement associated with the towers of FIGS. 2a and 2b is modified and does not employ the closed circuit fluid circulation typified by 75, 76, 77, 78 of the system of FIGS. 1a to 1d. Instead a supply of the hot gases from towers 118 on their way to the cold tower 114 are passed by conduit 200 to heat exchanger 178 and are cooled and have their moisture in part condensed by the countercurrent of a flow of the cold gases from tower 114 by pipe 179. The partially cooled gas from exchanger 178 is passed by pipe 201 to the secondary cooler and condenser 202 and thence by pipe 203 to the cold tower 114. The cooling circulation indicated at 209 for cooler-condenser 202 is supplied from an outside source.

In this system of FIGS. 2a and 2b the heat exchanger 178 raises the temperature of the cool gases received from cold tower 114 and at the same time provides heat for vaporization of the moisture for humidification, the make-up water for humidification being fed in at 205 at the entrance to the heat exchanger. Condensate from exchangers 178 and 202 are collected and delivered through pipes 206, 207 respectively wholly or in part to the top of the cold tower of the next succeeding stage.

In a similar manner supplies of the hot gases from towers 136, 148 and 160 on their ways to the cold towers 128, 142 and 156 respectively are passed to heat exchangers 184, 185 and 186 respectively and are cooled and have their moisture in part condensed by the countercurrent of a supply of cold gases from tower 114 by pipes 219, 221 and 223 respectively. The said supplies of gases from tower 114 are raised in temperature in heat exchangers 184, 185 and 186 and at the same time heat is provided for vaporization of moisture for humidification, this make-up water for humidification being fed in at 220, 222 and 224 respectively.

In any system of heat recovery between fluids entering and leaving a hot reactor, there may be direct physical contact only between the fluids entering and leaving, respectively, a single end of the reactor. This limitation is necessary to avoid commingling of processed material with unprocessed material. Accordingly, the system described herein has made use of the very efficient direct intimate contact methods of heat transfer together with the indirect non-contacting methods as required for the systems to which the invention is illustratively applied herein. For example, in FIGS. 1a to 1d the energy available from the gas leaving the hot tower is transferred by indirect contact heat exchanger (75, FIG. 1a; 84, 85, 86, FIG. 1a) to water which in turn transfers the energy by direct contact (intimate mixing in a countercurrent tower 78, FIG. 1b) with the gas entering the bottom of the hot tower. In this way it is possible to simultaneously heat and humidify the gas entering the hot tower. Likewise in FIGS. 2a and 2b, in exchanges 178, 184, 185 and 186 there is a simultaneous heating of the gas and vaporizing of the water required for humidification.

Another modified system may be employed in which the heat exchanges between the hot and cold flows are in general the reverse of those employed in FIGS. 1a and 1b. This modification makes use of a heat transfer cycle involving the pick-up of energy from a hot humidified gas by a liquid stream in a countercurrent direct contact, gas cooler dehumidifier tower and the subsequent liberation of this energy from the liquid to a cold gas stream by indirect contact in a countercurrent heat exchanger.

In this modification (FIG. 3) the cold tower 314 may be extended to include a section 314a at its bottom (or a separate tower) which will serve as the direct contact gas cooler-dehumidifier. The cold liquid from the bottom of the cold tower 314 together with an auxiliary flow via 314b passes countercurrent in 314a in contact with the hot humidified gas from the top of the hot tower 318 and becomes heated as the gas is cooled to the cold tower temperature. The cooled gas via 387 then flows upward through the cold tower 314. The hot liquid from the bottom of said direct contacting section 314a is divided. A portion 314c represented by the main cold tower stream plus the added condensate is sent to the hot tower and the balance 314d is sent to a heat exchanger 301 through which indirectly it transfers its energy to a mixture of the cold tower gas and a volume of liquid required for humidification, and thus the cold tower gas outflow 314f is simultaneously heated and humidified as the liquid in 314d is cooled. To make up for inefficiencies of the heat transfer equipment this liquid is further cooled in 314g, as required, before returning it to the same direct contacting section 314a via 314b.

The present invention thus affords systems for adjusting the temperature and saturation of a fluid and for reusing the heat therefrom in unique and advantageous manners.

From the illustrative embodiments of the invention above set forth it will be apparent to those skilled in the art that the present invention provides for the exchange of energy, in the source of the supply of heat to or extraction of heat from a saturable fluid and simultaneous desaturation or saturation thereof with saturating fluid, by a system in which at least one indirect contact heat transfer is employed, and in which, when supply and extraction of heat takes place at different locations, the system may advantageously include the employment of recirculating transfer liquid operating in direct contact with the saturable fluid at least at one of said locations and in series with said indirect heat transfer.

While there have been described herein what are at present considered preferred embodiments of the invention, modifications and changes and rearrangements may be made therein without departing from the essence of the invention; the exemplary embodiments are to be taken as illustrative and not restrictive of the invention, the scope of which is defined in the appended claims; and all modifications that come within the meaning and range of equivalency of the claims are intended to be included therein.

I claim:

1. Apparatus for the thermal processing at different temperatures of carried and carrier fluids comprising, in series connection, (a) a first means (78) for heating a flow of carrier gas and vaporizing thereinto a liquid to form carried vapor therein, said first means comprising an inlet thereto and an outlet therefrom for said flow and liquid inlet means, (b) a second means (18, 68) for treating the so heated flow and further heating the same and adding further vapor of said liquid thereto to be carried thereby, said second means having a gas inlet end with a gas inlet thereto and a gas outlet end with a gas outlet therefrom and having its gas inlet connected to the outlet from said first means to receive said flow therefrom, (c) a third means (75, 97) for cooling the so further heated flow and condensing carried vapor of such liquid therefrom, said third means having an inlet thereto connected to the gas outlet from said second means for receiving said flow therefrom, and having gas and liquid outlet means for discharging flows of the cooled gas and liquid condensate therefrom, (d) fourth (79) and fifth (100, 87) means connected respectively to the gas inlet to said first means and to the gas outlet of said third means for delivering to said first means and from said third means said flow of carrier gas, and (e) a sixth means (98) connected to the liquid outlet means of said third means for delivering therefrom, separate from said gas flow, liquid condensed from the carried vapor therein, and further comprising (f) seventh means (from 21 to 78) connected to the liquid inlet means of said first means for delivering into direct contact with the flow of gas therein liquid to be vaporized therein, and (g) said first and third means (78 and 75) having heat transfer means (76, 75, 77) interconnecting the same for extracting heat from said further heated flow in the third means to effect the cooling and condensing referred to in clause (c) and for transferring the so extracted heat to said first means to effect the heating and vaporizing referred to in clause (a), (h) said heat transfer means comprising an indirect contact heat exchanger (75) for maintaining the gas and condensate in said third means out of contact with the gas and liquid in said first means.

2. Apparatus as claimed in claim 1, wherein said heat transfer means also comprises (i) means comprising conduits connected between one side of said indirect contact heat exchanger and one of said first and third means for maintaining a circulation of said liquid through said side and in direct contact with said flow in said one of said first and third means.

3. Apparatus as claimed in claim 2, wherein said means (i) is connected to said first means to circulate said liquid in direct contact with the flow of gas therein.

4. Apparatus as claimed in claim 2, wherein said means (i) is connected to said third means to circulate said liquid in direct contact with the flow of gas therein.

5. Apparatus as claimed in claim 1, further comprising (j) vapor conduit means connected into said second means for delivering to said heated second means vapors of said liquid at a higher temperature than that of said flow from said first means.

6. Apparatus as claimed in claim 5, further comprising (k) said second means also comprising a liquid inlet at its gas outlet end and a liquid outlet at its gas inlet end, and means connected to said liquid inlet and outlet for passing a flow of said liquid in countercurrent direct contact with the flow of said gas in said second means and delivering said flow of liquid from said second means separate from the flow of gas therein, (l) a second indirect contact heat exchanger and a stripping means, said stripping means having a gas inlet end with a gas inlet thereto, a gas outlet end with a gas outlet therefrom, a liquid inlet at its gas outlet end and a liquid outlet at its gas inlet end, (m) means connected to the liquid outlet of said second means and to one side of said second indirect contact heat exchanger and thence to the liquid inlet of said stripping means for delivering through said heat exchanger and to said stripping means the flow of liquid delivered from said second means, (n) means connected to the gas inlet of said stripping means for delivering thereto into direct contact with the flow of liquid therein a hotter flow of said liquid in vapor form, for further heating said flow of liquid and stripping dissolved gas therefrom, (o) the gas outlet of said stripping means being connected to said vapor conduit means (j) for delivering to said second means therethrough the uncondensed vapors of said liquid and gas stripped in said stripping means, and (p) the liquid outlet of said stripping means being connected to the other side of said indirect contact heat exchanger for delivering the further heated flow of liquid from said stripping means therethrough for raising the temperature of the flow of liquid passing to the stripping means therethrough.

7. Apparatus as defined in claim 6, wherein said heat transfer means also comprises (i) means comprising conduits connected between one side of said indirect contact heat exchanger and one of said first and third means for maintaining a circulation of said liquid through said side and in direct contact with said flow in said one of said first and third means.

8. Apparatus as defined in claim 7, wherein said means (i) is connected to said first means and to circulate said liquid in direct contact with the flow of gas therein.

9. Apparatus as defined in claim 7, wherein said means (i) is connected to said third means and to circulate said liquid in direct contact with the flow of gas therein.

10. Apparatus for the thermal processing at different temperatures of carried and carrier fluids including a series connection comprising (a) an initial heating means (23, tube side) for initially heating a flow of carrier fluid (from 22) essentially saturated with a content of carried fluid, (b) second means (67, 66) for the further heating of said flow and the separation (via 68) of carried fluid therefrom subsequent to the initial heating thereof, and (c) flow producing means (21) connected in said series connected for delivering through said initial means and to said second means said flow of carrier fluid, said combination further comprising (d) means (69, 23-shell side, 24) connected in said series connection for cooling the further heated flow of carrier fluid referred to in clause (b) and transferring heat from said cooling to the flow of fluid referred to in clause (a) while maintaining said flows out of contact with each other, and being further characterized in that (e) the means (67, 66) for further heating of said flow referred to in clause (b) comprising delivery means (66) connected to deliver into direct contact with said flow a quantity of one of said fluids heated to a higher temperature than that of the initially heated flow, (f) the initial heating means (a) (23, tube side) comprises liquid inlet means (22) for delivering thereto liquid comprising carried fluid and for vaporizing carried fluid therefrom by a part of the heat transferred thereto by means (d).

11. Apparatus as claimed in claim 10, in which (f) the flow producing means referred to in clause (c) is a gas pump, (g) the carrier fluid and carried fluid are a gas and a vaporizable liquid respectively, (h) the fluid delivered by the delivery means referred to in clause (e) is a quantity of vapor of said liquid, and (i) the means for the separation of carried fluid referred to in clause (b) is the cooling means referred to in clause (d).

12. Apparatus as claimed in claim 10, in which (f) the flow producing means referred to in clause (c) is a liquid pump, (g) the carrier fluid is a liquid and the carried fluid is a gas soluble in said liquid, (h) the fluid delivered by the delivery means referred to in clause (e) in a quantity of said liquid in vapor form, and (i) the means for the separation of carried fluid referred to in clause (b) is a gas outlet connected to said further heating means for conveying therefrom uncondensed portions of the fluid referred to in clause (h) and gas evolved from solution the flow of said liquid.

13. Apparatus according to claim 10, wherein said initial heating means (a) further comprises outlet means for discharge of liquid therefrom, and said liquid inlet means comprises means for delivering to said means (a) liquid comprising a greater quantity of carried fluid than is vaporized therein.

14. Apparatus according to claim 1, wherein said first means also comprises liquid outlet means for discharging liquid therefrom, and said liquid inlet means comprises means for delivering to said first means a greater quantity of said liquid than is to be vaporized therein.

* * * * *